United States Patent [19]

Hishida et al.

[11] Patent Number: 5,305,224

[45] Date of Patent: Apr. 19, 1994

[54] FUZZY CONTROL FOR A LAMP GLASS PIPE SEALING PROCESS

[75] Inventors: Masahiko Hishida; Terukuni Yokoyama; Yoshihiro Atsumi, all of Tokyo; Motonobu Masui; Yasuo Ban, both of Kumagaya, all of Japan

[73] Assignees: Mitsubishi Genshiryoku Kogyo Kabushiki Kaisha; Iwasaki Electric Co., Ltd., Tokyo, Japan

[21] Appl. No.: 948,153

[22] Filed: Sep. 21, 1992

[30] Foreign Application Priority Data

Sep. 24, 1991 [JP] Japan ............................... 3-243665

[51] Int. Cl.⁵ ..................... G06F 15/46; G05B 13/02
[52] U.S. Cl. .............................. 364/473; 364/477; 364/148; 65/160; 65/162
[58] Field of Search ............... 364/473, 474, 510, 148; 395/1, 900; 65/32.5, 34, 36, 160, 162

[56] References Cited

U.S. PATENT DOCUMENTS

| | | | |
|---|---|---|---|
| 4,910,684 | 3/1990 | Ostergaard et al. | 364/503 |
| 5,091,844 | 2/1992 | Waltz | 364/153 |
| 5,122,957 | 6/1992 | Hattori | 364/424.02 |

FOREIGN PATENT DOCUMENTS 2904383  8/1980  Fed. Rep. of Germany .
3-209137  9/1991  Japan .

Primary Examiner—Jerry Smith
Assistant Examiner—Paul Gordon
Attorney, Agent, or Firm—Brooks Haidt Haffner & Delahunty

[57] ABSTRACT

A fuzzy controller is provided which enables even an unskilled operator to easily adjust various conditions in a glass pipe sealing process. The fuzzy controller has a fuzzy control processor including an image processing unit for processing and calculating image information as a softened state change value of the glass pipe and a combustion state value of burner flame, and a fuzzy control processing unit for calculating and outputting, by receiving a result of this calculation, a suitable control value for controlling parameters relating to the burner flame by fuzzy inference. The fuzzy controller may further has a fuzzy diagnosis support processor which, if there is an abnormality in the sealed portion of the glass pipe and if the state of the glass pipe after sealing is input to the manipulation instruction data input support processor by the operator, automatically ascertains the cause of the abnormality by using fuzzy inference and displays it on a CRT. A fuzzy control system and a fuzzy control process are also provided which enable automatization of a lamp glass pipe sealing process by using this fuzzy controller.

5 Claims, 10 Drawing Sheets

① THERE IS A STRONG RELATIONSHIP
(OR "VERY CERTAIN")

② THERE IS A RELATIONSHIP (OR CERTAIN)

③ THERE IS A WEAK RELATIONSHIP (OR PROBABLE)

INITIAL STATE t = 0

TRANSIENT STATE t = t1

SOFTENED STATE t = t2

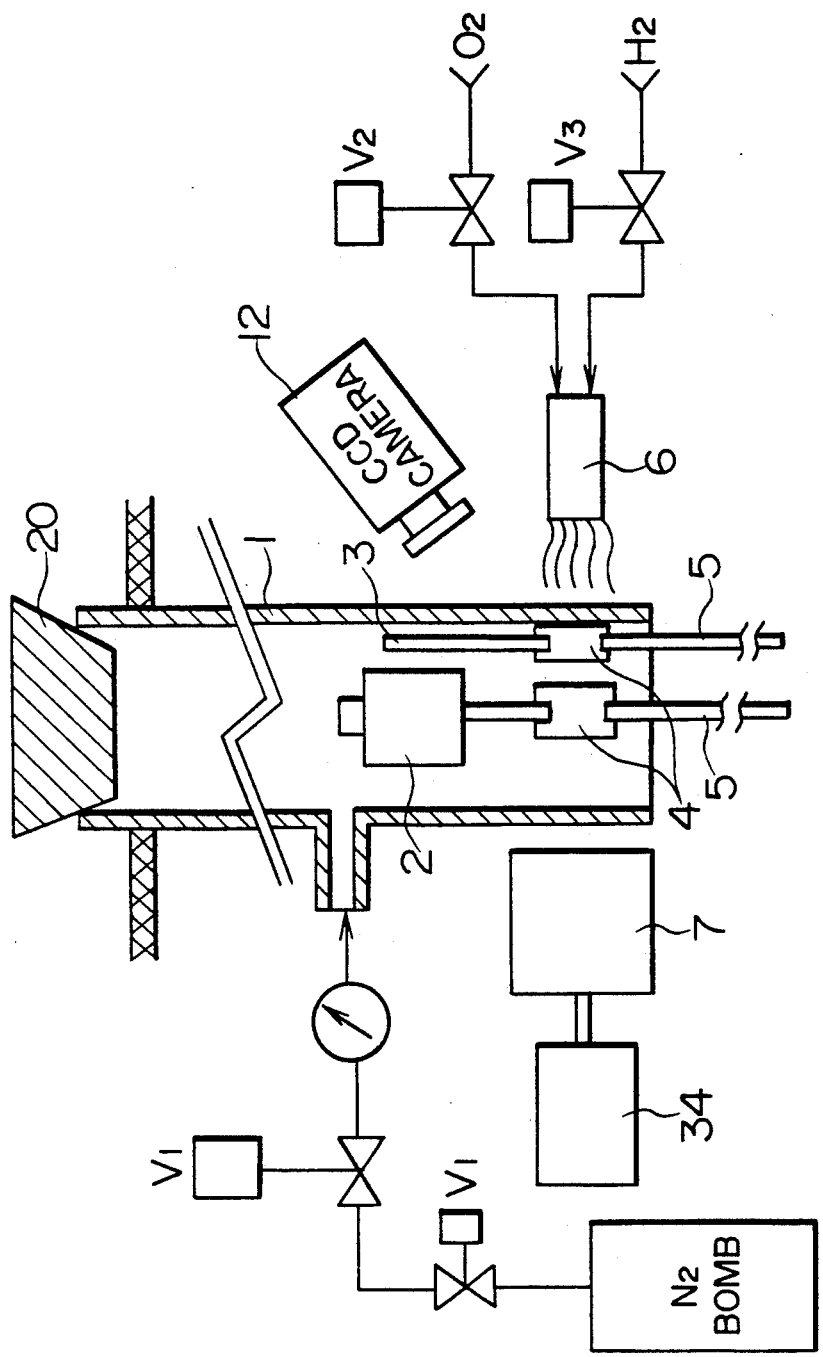

FUZZY CONTROL FOR A LAMP GLASS PIPE SEALING PROCESS

BACKGROUND OF THE INVENTION

1. Field of the Invention

This invention relates to a fuzzy controller, a fuzzy control system and a fuzzy control process which can be utilized for control of the flow rate and/or the pressure of a combustible gas, a supporting gas and a shielding gas in a burner used in the step of sealing a lamp glass pipe in a lamp manufacturing process, a combustion time control of the burner, a glass pipe seal abnormality diagnosis, and so on.

2. Description of the Related Art

Conventional lamp manufacturing processes require a special step at the time of enclosing electrodes in opposite end portions of a glass pipe of, for example, a quartz glass luminous tube of a discharge lamp, in which step a skilled operator sets optimal conditions for pressing the glass pipe ends so that foil portions of the electrodes are enclosed in optimal conditions by observing and judging the softened state of the glass pipe, the shape and light emitting state of the burner flame with the eyes.

That is, as conditions for the optimization of the softened state of the glass pipe for enabling the glass pipe to be sealed, the heating power of the burner, the state and characteristics of the flame and the period of time between the heating start time and the time at which the glass is softened to an extent such as to be suitable for being pressed are considered to be important. To set these conditions, therefore, a skilled operator judges the softened state of the glass pipe and the state of the burner flame from the shape and the light emitting state thereof with the eyes, presumes a cause of an abnormality by observing the state of the pressed sealed end portion of the glass pipe with the eyes, and weighs and suitably sets various parameters relating to the burner flame in the glass pipe sealing process, i.e., parameters of the control of the flow rate or the pressure of a combustible gas, a supporting gas, and a shielding gas, and parameters of glass sealing conditions, burner position control condition, and so on.

This conventional method will be described below in more detail with reference to FIGS. 6 to 13. FIG. 6 is a cross-sectional view of a glass pipe I in a state before being heated with a burner 6, FIG. 7 is a cross-sectional view in a direction perpendicular to the direction of FIG. 6, and FIG. 8 is a cross-sectional view taken along the line A—A of FIG. 7. As shown in FIGS. 6 to 8, a main electrode 2, an auxiliary electrode 3, molybdenum foil 4, lead wires 5 are inserted through an end portion of the glass pipe 1, while a temporary plug 20 (FIG. 13) is fitted in the pipe 1 at the other end, and the burner 6 is thereafter ignited to heat the glass pipe 1. As the end portion of the glass pipe 1 is heated and softened, a constricted portion 8 is formed as shown in FIGS. 9 (a), 9 (b) and 9 (c). The operator observes the shape of the constricted portion 8, the light emitting state of the glass pipe 1, the intensity and the color of the burner flame with the eyes to judge whether or not the conditions are suitable.

After a further predetermined period of time, mold parts 7 for pressing are automatically moved toward the glass pipe end by an air cylinder 14 (FIG. 13) to press the glass pipe end or reduce it in thickness so that the molybdenum foil 4 and the lead wires 5 are brought into close contact with the inner surface of the glass pipe end. The glass pipe end is thereby sealed. The molybdenum foil 4 is provided as intermediate portions of the leads 5 to enable the leads to be completely enclosed. The molybdenum foil 4 is welded to the leads 5. After the pressing, the operator observes the glass pipe end to judge whether or not the conditions are suitable from the existence/non-existence of defects, such as those shown in FIG. 12, i.e., creases 9 of a seal surface, press deficiencies A to D, and breaks 10 in the molybdenum foil 4.

With respect to causes of such defects, skilled operators know, from their experience, that the burner 6 heating time determining the extent to which the glass pipe 1 is softened by heating, the rate at which nitrogen gas is caused to flow to prevent the auxiliary electrode from being oxidized with oxygen in air when heated, and the force of pressing the mold parts 7 influence the occurrence of creases 9 of the seal surface and breaks in the molybdenum foil 4.

For example, in case where many creases 9 occur in the seal surface while breaks 11 occur in the welding portion between the lead wires and the molybdenum foil 4, the influence of the nitrogen flow rate is large. Also, the nitrogen flow rate relates strongly to the occurrences of breaks and oxidation of a central portion on the molybdenum fail 4. Similarly, if the effect of pressing is insufficient and if the burner time, i.e., the heating time is short, a void occurs in the portion B shown in FIG. 12. Conversely, if the burner heating time is excessively long, a tare deformation occurs such that the shape of the portion E shown in FIG. 12 is undesirable. If the burner position is so high that the glass pipe end heating position is not suitable, a press deficiency occurs at the portion D.

As described above, to prevent these defects, it is necessary to suitably set and control various conditions including the glass pipe end temperature, the nitrogen flow rate, the burner heating power, the glass pipe end heating position and the press pressure. According to the conventional method, a skilled operator examines the above-mentioned various defects with the eyes and determines control conditions for the glass pipe sealing step.

However, the above-described various conditions relate strongly to each other and automatization of the process of controlling them has been difficult. It has therefore been necessary that a skilled operator must obtain necessary information with the eyes and adjust the burner heating time from the heating start to the moment when a softened state of the glass pipe suitable for pressing is reached, the nitrogen flow rate (controlled with a valve $V_1$ shown in FIG. 13), the burner heating power, i.e , the flow rate and the pressure of hydrogen and oxygen (controlled with valves $V_2$ and $V_3$ shown FIG. 13), the burner position, pneumatic pressure for controlling the pressure and speed of the press (controlled with an air cylinder 34 shown in FIG. 13) based on skilled operator's empirical knowledge which is difficult to express or hand down.

Moreover, it is very difficult for an unskilled operator to ascertain the caused of defect from the apparent condition of the sealed glass pipe because of the complex existence of the causes as well as the observation with the eyes. Also, it is very difficult even for a skilled operator to suitably judge the control conditions.

Because the sealing operation has been performed mainly by a manual control as described above, there have been the problem of retaining highly skilled operators, and the problem of the product qualities being varied depending upon the operators, so that the reliability of the manufacturing process is low. If glass pipes are manufactured while changing specifications with respect to glass pipe manufacture lots, the above-described adjustment must be performed each time of lot change, which is very troublesome. Also, it is necessary even for a skilled operator to repeat the readjustment operation many times to find optimum conditions, and this process is very time-consuming.

SUMMARY OF THE INVENTION

It is therefore an object of the present invention to provide a fuzzy controller, a fuzzy control system and a fuzzy control process for glass pipe sealing which can facilitate the process of adjusting various conditions for the glass pipe sealing step, which otherwise has been achieved by skilled operators alone.

Another object of the present invention is to provide a fuzzy controller capable of instructing an unskilled operator by designating an adjustment operation procedure to enable the unskilled operator to perform the adjustment of various conditions while making the adjustment process easier.

To achieve these objects, according to the present invention, a lamp glass pipe sealing process for sealing a glass pipe by hearing an end portion of the glass pipe with burner flame to soften the end portion and by thereafter pressing the softened end portion is controlled in a fuzzy control manner based on an applied fuzzy theory. A fuzzy controller in accordance with the present invention comprises a camera device for forming an image of the state of the burner flame and the softened state of the glass pipe, and a fuzzy control processor including image processing means for processing and calculating image information obtained by the camera device as a softened state change value of the glass pipe and a combustion state value of the burner flame based on image processing data, and fuzzy control processing means for calculating and outputting, with respect to a result of the calculation performed by the image processing means, a suitable control value for controlling at least one parameter relating to the burner flame by fuzzy inference and based on fuzzy control data including a predetermined fuzzy rule and a membership function.

The fuzzy control processor in accordance with the present invention further includes state display processing means for receiving a pseudo color image from the image processing means to display the received image on a cathode ray tube (CRT), and for displaying, on the CRT, the control value output from the fuzzy control processing means as an amount of manipulation of the parameter relating to the burner flame. The operator of the fuzzy controller can use the pseudo color image on the CRT as a material contributing to the completion of a judgment.

The fuzzy controller for the lamp glass pipe sealing process in accordance with the present invention further comprises a fuzzy diagnosis support processor including manipulation instruction data input support processing means for converting the content of an input received as a result of observation of a finished state of the sealed glass pipe into a corresponding predetermined fuzzy rule and a membership function based on fuzzy diagnosis data, and manipulation instruction processing means for performing fuzzy inference by receiving the converted result from the manipulation instruction data input support processing means to output a method of manipulating the control value to the cathode ray tube. Thus, if there is an abnormality in the sealed portion of the glass pipe, and if the state of the glass pipe after sealing is input to the manipulation instruction data input support processing means by the operator, the fuzzy diagnosis support processor automatically ascertains the cause of the abnormality by using fuzzy inference and displays it on the CRT.

Further, the present invention provides a fuzzy control system and a fuzzy control process in which signals representing the control value, the amount of manipulation and the manipulation method obtained by the above-described fuzzy controller are output from the fuzzy controller through an A/D converter to an operating system which receives these signals as operating instruction signals, thereby operating a burner and a press mold. In these systems, the driving means for driving the burner and the press mold can be automatically started to automatically adjust, for example, the burner flame, the burner position, the burner time, and the pressure of the press mold so as to achieve the same adjustment performance as the adjustment performed by skilled operators.

BRIEF DESCRIPTION OF THE DRAWINGS

FIG. 13 is a schematic diagram of appliances used to seal the glass pipe end portion.

DESCRIPTION OF THE PREFERRED EMBODIMENT

Figure 1:
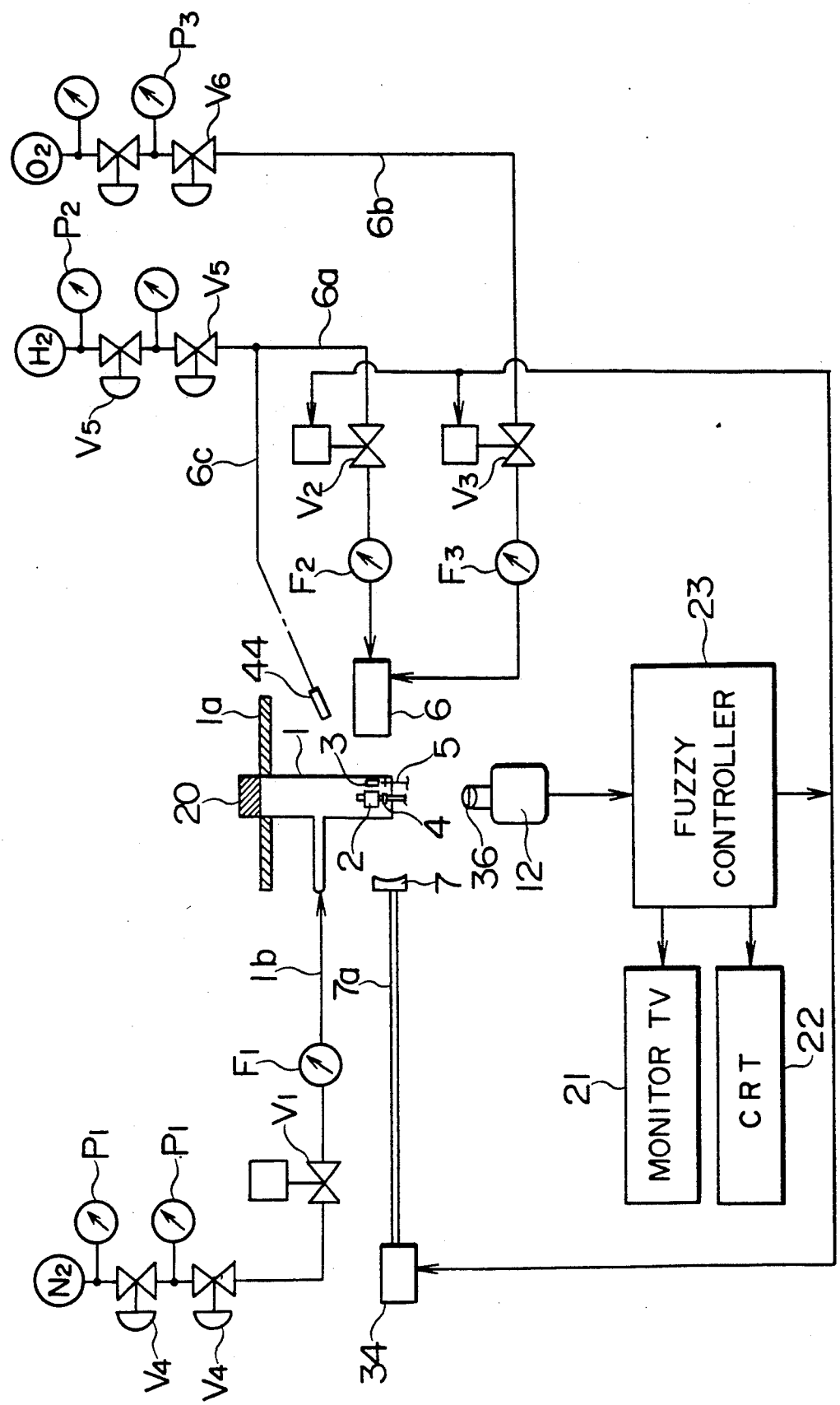
FIG. 1 is a diagram of a system of glass pipe manufacturing facilities including a fuzzy controller in accordance with the present invention.

A preferred embodiment of the present invention will be described below with reference to the accompanying drawings in which identical or corresponding components are indicated by the same reference characters.

Figure 2:
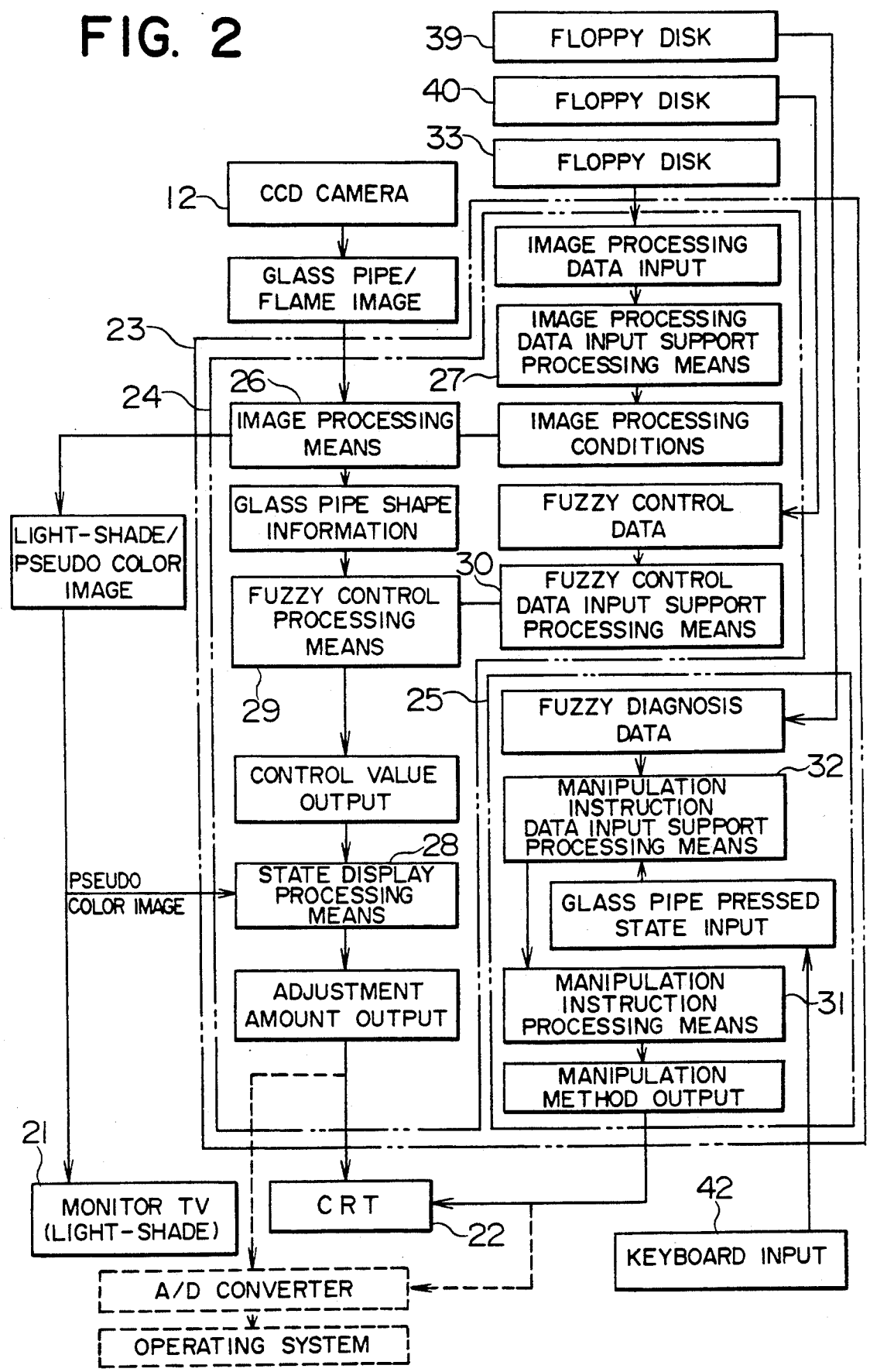
FIG. 2 is a block diagram of the functions of the fuzzy controller in accordance with the present invention.
Figure 3:
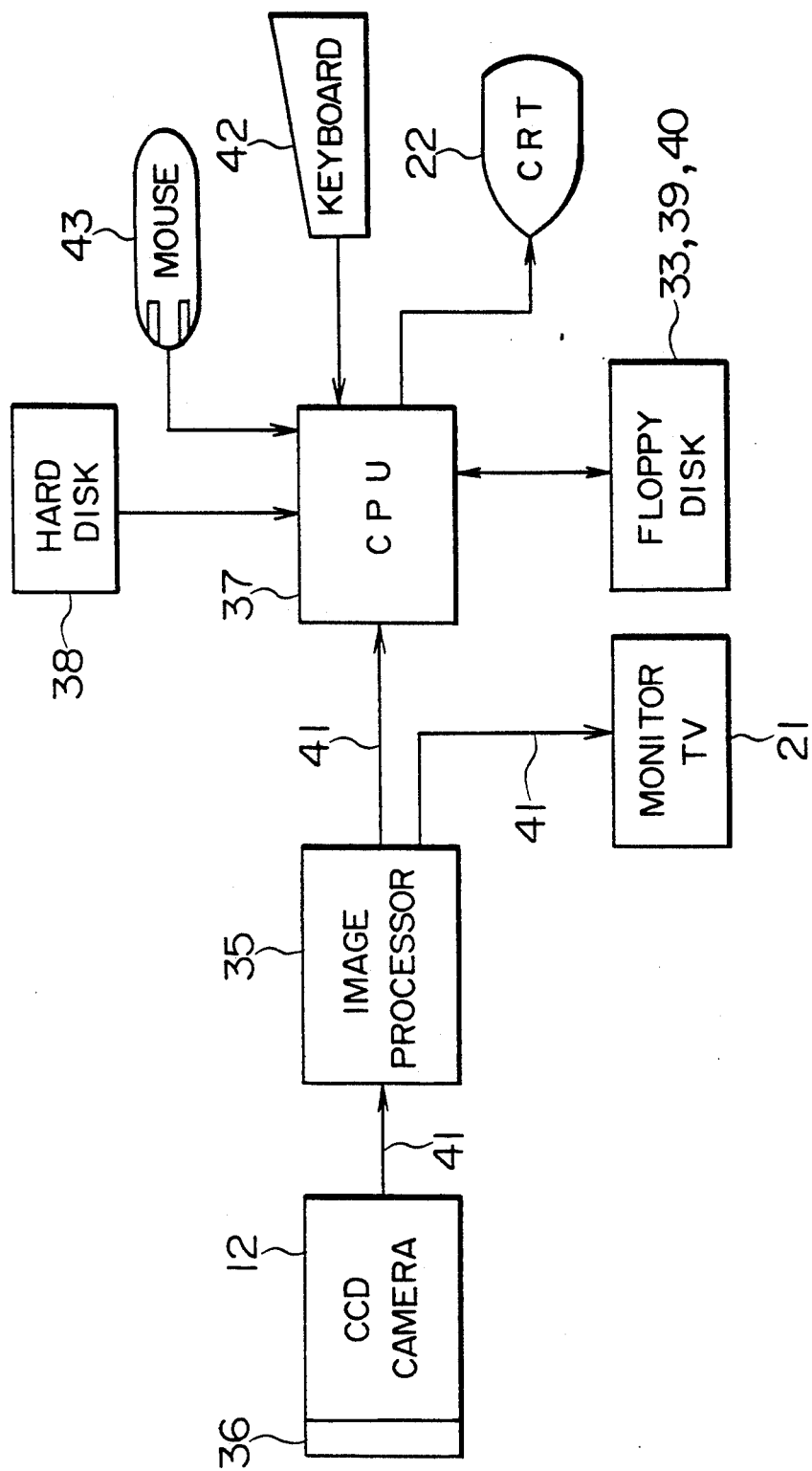
FIG. 3 is a block diagram of an example of the construction a hardware arrangement having the functions shown in FIG. 2.

FIG. 1 is a schematic diagram of the system including a fuzzy controller 23 in accordance with an embodiment of the present invention and other peripheral units in glass manufacturing facilities, FIG. 2 is a block diagram showing the functions of the fuzzy controller 23, and FIG. 3 shows a hardware construction for realizing the functions shown in FIG. 2.

Referring to FIG. 1, a glass pipe 1 into which a temporary plug 20 for preventing escapement of nitrogen gas is fitted is fixed by a suitable fixing device 1a. An assembly of a main electrode 2, an auxiliary electrode 3, molybdenum,, foil 4 and lead wires 5 is previously inserted in the glass pipe 1 through an end portion thereof, as in the case of the above-described related art (FIGS. 6 to 13). The glass pipe 1 is connected to a nitrogen bomb $N_2$ through a nitrogen supply pipe 1b having an injection valve $V_1$ and a source valve $V_4$. The nitrogen supply pipe 1b is provided with a pressure gauge $P_1$ and a flow meter $F_1$.

In this embodiment, a pair of burners 6 are disposed outside the end portion of the glass pipe so as to face each other in a diametrical direction, and a pair of mold parts (press) 7 are also disposed between the burners 6 so as to face each other in a diametral direction. In FIG. 1, however, only one burner 6 and only one mold part 7 are illustrated. Each mold part 7 is mechanically connected to an air cylinder 34 through a piston rod 7a. Each burner 6 is connected to a hydrogen bomb $H_2$ through a hydrogen supply pipe 6a and to an oxygen bomb $O_2$ through and oxygen supply pipe 6b. The hydrogen supply pipe 6a is provided with an injection valve $V_2$, a source valve $V_5$, a pressure gauge $P_2$ and a flow meter $F_2$, while the oxygen supply pipe 6b is provided with air injection valve $V_3$, a source valve $V_6$, a pressure gauge $P_3$ and a flow meter $F_3$. A pilot burner 44 is connected to a branch pipe 6c extending from the hydrogen supply pipe 6a.

To the glass pipe 1 into which the temporary plug 20 is fitted, nitrogen gas is supplied by opening the nitrogen source valve $V_4$ and the injection valve $V_1$, so that the atmosphere in the glass pipe 1 is replaced with nitrogen gas. To initiate the process of sealing the glass pipe end starting from the operation of heating the glass pipe end, the hydrogen source valve $V_5$, the hydrogen injection valve $V_2$, the oxygen source valve $V_6$ and the oxygen injection valve $V_3$ are opened, the pilot burner 44 is thereafter ignited and the burners 6 are then ignited by the pilot burner 44, along with an initiation of image measurement in the fuzzy controller 23.

Referring to FIGS. 1 and 3, a charge-coupled-device (CCD) camera 12 is mounted in a suitable position such as to be capable of observing the state of heating of the glass pipe 1 or the sealing step through an optical filter 36. The CCD camera 12 is electrically connected to the fuzzy controller 23 in accordance with the present invention, and output terminals of the fuzzy controller 23 are connected to a monitor TV 21 and a cathode ray tube (CRT) 22. The state of heating is monitored on the monitor TV 21 by using the CCD camera 12. The monitor image is supplied to the fuzzy controller 23 in every time step manner, and image data thereby obtained is processed by the fuzzy controller 23.

When a predetermined time for the glass pipe heating elapses, the image measurement is ended and the mold parts 7 are moved to the glass pipe 1 by the air cylinders 34 to seal the glass pipe by pinching the same between the mold parts 7 while extinguishing the burners 6. During this process, the fuzzy controller 23 processes the images of the burner flame and the glass pipe 1 supplied from the CCD camera 12, and displays a pseudo color image on the CRT 22. Simultaneously, the fuzzy controller 23 examines or diagnoses the image information on the glass pipe and the burner flame by fuzzy inference and displays the result of processing as amounts of manipulation (adjustment) on the CRT 22. The arrangement may be such that, as indicated by the dotted line in FIG. 2, an manipulation amount output is converted into an analog signal by an A/D converter, and an output signal therefrom is transmitted to an operating system which receives this signal as an operating instruction signal. Also, the fuzzy controller 23 can supply the result of operator's eye-observation of the finished state about sealing of the glass pipe 1 to a fuzzy diagnosis support apparatus 25 (FIG. 2) when the above-described process is completed, and can display the result of diagnosis based on fuzzy inference as amounts of manipulation (amounts of adjustment) on the CRT 22. The above-described process is repeated based on the amounts of manipulation thus obtained, thereby enabling optimal adjustment to be performed in a comparatively short period of time.

Referring then to FIG. 2 showing the functions of the fuzzy controller 23, the fuzzy controller 23 has the above-mentioned CCD camera 12, the CRT 22 and the monitor TV 21 as accompanying facilities, and has a fuzzy control processor 24 and the fuzzy diagnosis support processor 25 as accompanying functional units. The fuzzy control processor 24 and the fuzzy diagnosis support processor 25 are incorporated in a hard disk 38 and a central processing unit (CPU) 37 shown in FIG. 3. The hardware construction of this system will be described later with reference to FIG. 3.

When the operator inputs data on a finished state about sealing of the glass pipe, the fuzzy diagnosis support processor 25 functions to presume the cause of an abnormality by fuzzy diagnosis using a causal sequence matrix abnormality causes and symptoms to complement the diagnosis functions of the fuzzy control processor 24, and display the presumed cause and a process for removing the abnormality on the CRT 22.

The fuzzy control processor 24 is a group of software means consisting of image processing data stored in a floppy disk 33, fuzzy control data stored in a floppy disk 40, an image processing data input support processing means 27, an image processing means 26, a fuzzy control data input support processing means 30, a fuzzy control processing means 29, and a state display processing means 28. The fuzzy diagnosis support processor 25 is a group of software means consisting of fuzzy diagnosis data stored in a floppy disk 39, a manipulation instruction data input support processing means 32, and a manipulation instruction processing means 31.

FIG. 3 shows the hardware construction for realizing the above-described functions. The system shown in FIG. 3 is formed of the above-mentioned CCD camera 12, an optical filter 36 for suitably inputting only information on the glass pipe and the burner flame to the CCD camera 12 by removing background light, a signal transmission cable 41, an image processor 35, the monitor TV 21, a CPU 37, which may be a personal computer, such as that put on the market as PC-9801RA, or an engineering work station, the hard disk 38, a mouse 43, a keyboard 42, the CRT 22, and the floppy disks 33, 39, and 40.

The operation of the above-described fuzzy controller 23 will be described below in detail with reference to FIGS. 1 to 5. First, the assembly of the main electrode 2, the auxiliary electrode 3, the molybdenum foil 4 and the lead wires 5 is inserted into the glass pipe end portion to a predetermined depth thereof and is then fixed (see FIG. 13). The jig for fixing the assembly may be well-known one, which is not illustrated. Thereafter, data on the size of the glass pipe, the kind and the size of the electrodes is input to the CPU 37 of the fuzzy controller 23 through the keyboard 42.

The fuzzy controller 23 drives its internal system based on this input to instruct the operator to set the openings of the nitrogen, hydrogen and oxygen injection valves, i.e., the flow control valves $V_1$, $V_2$, and $V_3$, the burner position (the kind of the burner, the distance from the glass pipe surface and the height from the pipe end) necessary for adjustment in the step of sealing the glass pipe of the determined size, i.e., various parameters relating to the burner flame by showing the operator the past optimal information by a CRT display, or to automatically initialize the valve openings and the burner position by sending opening signals to the valves and also sending a signal to a burner position setting device (not shown). Under these set conditions, the burners 6 are ignited to start heating the glass pipe end portion, so that the glass pipe 1 strongly emits light with the increase in its temperature.

The CCD camera 12 outputs images of the burner flame and the glass pipe as information in accordance with the intensities of light therefrom. To characteristically extract only information on the luminance of the burner flame and the glass pipe, the filter 36 for removing the background light is provided on the camera 12. Only information substantially representing the emission from the burner flame and the glass pipe is thereby outputted from the CCD camera 12.

This image information is sent to the image processor 35 to be converted into a digital signal which is then processed by the image processing means 26 to output an emission luminance distribution with the softening of the heated glass pipe 1 as a light-shade image to the monitor TV 21 and to output a pseudo color image to the CRT 22 through the state display processing means 28. Also, a plurality of snap shots of the images at different time steps are taken during the heating time to be used in image processing measurement by the image processing means 26. The flow rate and the pressure of hydrogen and oxygen and the heating time are maintained in accordance with the conditions previously set and there are no changes in the parameters of the burner 6 during the heating. Therefore, image processing relating to the burner flame is performed with respect to only one snap shot, and corresponding image measurement is performed by the image processing means 26. The image processing data is read from the floppy disk 33 to the image processing data input support processing means 27 to establish a setup state necessary for image processing, when the fuzzy controller 23 is started.

Figure 9A:
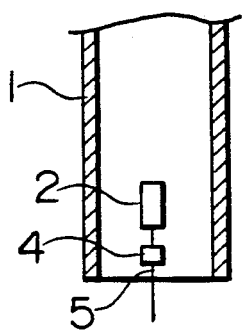
FIGS. 9(a), 9(b), and 9(c) are cross-sectional views of the change in shape of the glass pipe when the glass pipe is softened.
Figure 9B:
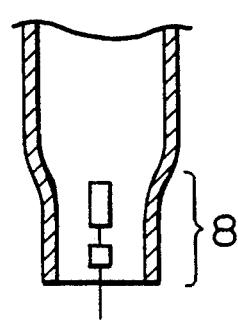
Figure 9C:
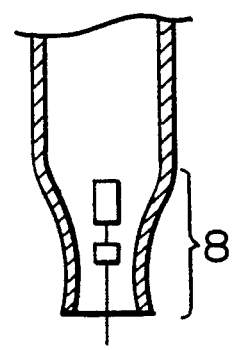
Figure 10:
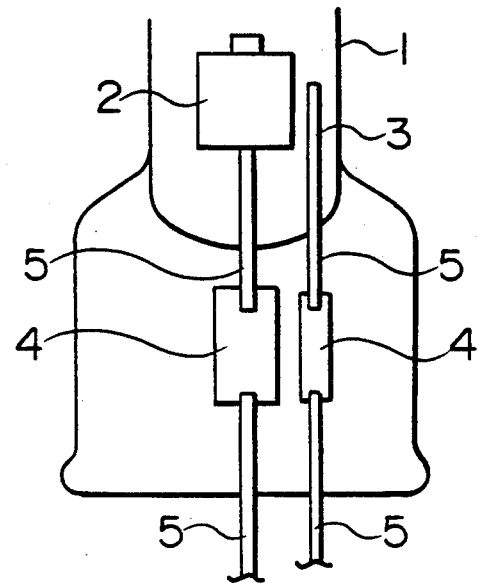
FIG. 10 is a diagram of a pressed state of the glass pipe.
Figure 11:
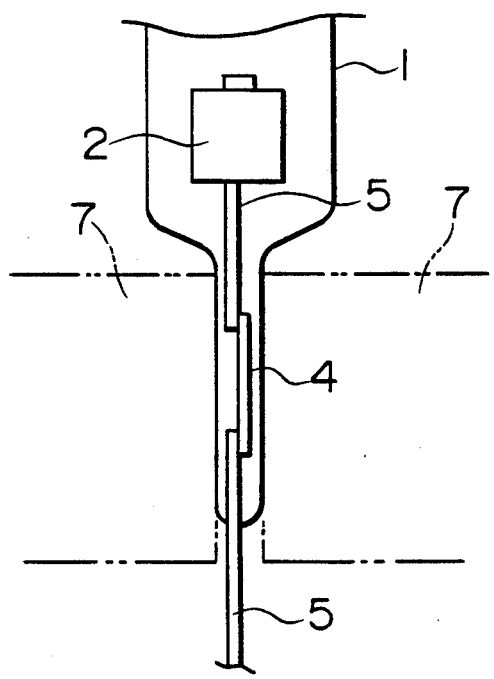
FIG. 11 is a side view of FIG. 10.

Next, the relationship between the image measurement and the phenomenon appearing on the glass pipe 1 will be described below in detail. The glass pipe 1 is softened and slightly changed in shape with the progress of heating, as described above with reference to FIG. 9. Referring to FIG. 9, although the change in the shape of the glass pipe 1 is illustrated in an exaggerating manner in FIG. 9, the change in the diameter of the glass pipe 1 (width in a lateral direction) is started at a time $t_1$ so that a constricted portion 8 is formed thereon, and a portion reduced in thickness thereof moves downward by its weight at a time $t_2$ (The height through which the glass pipe emits light is called "fired width"). A change in the lateral width of about 1 mm, and a fired width covering a position several millimeters higher than the electrode position or defining a fired range such that the material in a lower end peripheral portion of the glass pipe protrudes slightly outward are suitable for pressing the glass pipe. The image pickup signal from the CCD camera 12 contains information on the change in the shape of the glass pipe as glass pipe luminance information. Accordingly, the rate of change in the shape with respect to time can be calculated by the image measurement of the image processing means 26. With respect to the burner flame, strong portion (having a strong tinge of blue) and a weak portion (having a strong tinge of red) of the flame of the burner 6, and the overall distribution of such portions can also be calculated as relative state values by the image processing measurement of the luminance distribution.

With respect to the relationship between the state values obtained as these image measurement processing results and the amounts of manipulation corresponding to the state values obtained as the content of a diagnosis performed by a skilled operator, the empirical knowledge of the skilled operator is previously made significant in the form of a fuzzy inference program using fuzzy rules and membership functions (belonging-degree functions) by the fuzzy control data input support processing means 30 for the fuzzy control processing means 29. Data necessary for this processing is read as fuzzy control data from the floppy disk 40 or the hard disk 38 to be initially set in the fuzzy control data input support processing means 30, when the fuzzy controller 23 is started. That is, in correspondence with the confirmation of the state values and the determination of the manipulation amounts performed by the operator with the eyes, the relationship between the state values obtained as the result of the image processing measurement and the amounts of manipulation of the hydrogen and oxygen injection valves $V_2$ and $V_3$ and the burner heating time is expressed in the form of if-then rules, the state values as the result of the image processing measurement, the burner heating time (burner time) and the amounts of manipulation of the injection valves $V_2$ and $V_3$ are expressed in the form of fuzzy membership functions, and the contents of decisions made by the operator are stored as a fuzzy computer program in the hard disk 38 or a memory of the CPU 37 belonging to the computer. Then, the fuzzy control processing means 29 automatically outputs decision information (necessary amounts of adjustment or manipulation) similar to that of the operator with respect to the image processing measurement result input. The content of the output is suitably compiled by the state display processing means 28.

Figure 4:
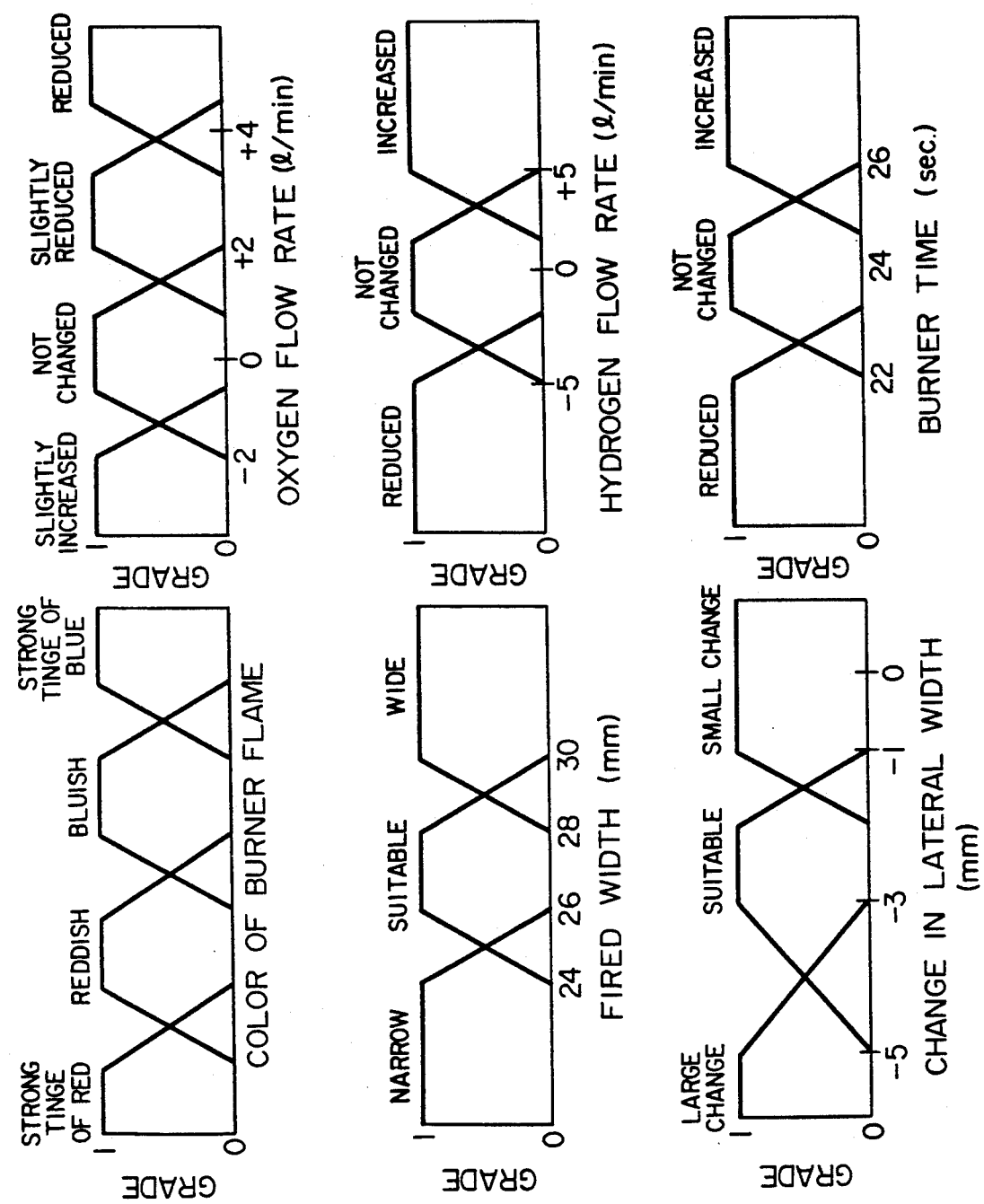
FIG. 4 is a diagram of examples of membership functions relating to a fuzzy control processor.

FIG. 4 shows examples of the membership functions initially set in the fuzzy control data input support processing means 30. The three membership functions on the left hand side of FIG. 4 relate to the state values of the color of the burner flame (luminance information from the CCD camera), the fired width (the glass pipe emission height) and lateral widths (the reduction in thickness of the glass pipe) obtained as image processing measurement results, and the other three membership functions on the right hand side relate to the amounts of manipulation of the injection valve $V_3$ (the oxygen flow rate), $V_2$ (hydrogen flow rate) and the burner heating time (burner time).

The content of the operation of the fuzzy control processing means 29 incorporating these membership functions and capable of determining the amounts of adjustment or manipulation in accordance with the fuzzy control rules by using the relationship between the state values and the amounts of manipulation will be described below. The empirical knowledge of the skilled operator relating to the amounts of adjustment or manipulation is also expressed in the form of membership functions, and the fuzzy control processing means 29 calculates values of the amounts of adjustment or manipulation.

With respect to the burner flame, a rule is set as RULE 1 described below. If the rate of combustion, i.e., the oxidation rate is large, wavelengths in the ultraviolet range of the hydrogen-oxygen reaction are increased, so that the flame is light blue. If the amount of hydrogen is in excess, the tinge of light blue is further increased, because hydrogen excitation rays are in the ultraviolet range. Conversely, if the amount of oxygen is in excess, the flame has a tinge of red, because of light absorption of oxygen not consumed for oxidation and water generated by the combustion. That is, if the combustion rate is increased, the temperature is increased, so that the flame is light blue. If the combustion rate is reduced and if the temperature is low, the flame has a tinge of red. Accordingly, the state of combustion can be determined from the color of the flame. On the basis of this relationship, rules of the oxygen and hydrogen flow rates can be formed.

RULE 1

If the flame color (luminance information) is light bluish (high), then the oxygen flow rate is not changed;

If the flame color (luminance information) is reddish (low), then the oxygen flow rate is increased;

If the flame color (luminance information) contains a stronger tinge of blue (very high), then the oxygen flow rate is reduced;

If the flame color (luminance information) is reddish (low), then the hydrogen flow rate is reduced; and If the flame color (luminance information) contains a stronger tinge of blue (very high),then the oxygen flow rate is reduced.

Although the amounts of manipulation of the injection valves $V_2$ and $V_3$ are treated abstractly and are not described as particular values, instructions for changing the valve openings proved as the result of the operation of the fuzzy control processor 24 are output in the form of the direction of rotation and the number of revolutions of the valve rods as necessary amounts of adjustment or manipulation.

With respect to the glass pipe, a rule is set as RULE 2 described below. The amount of change in the fired width is recognized relative to a proper value. If the amount of change is increased fast so as to be greater than the proper value, it is recognized as a value unsuitable for the set burner time. The change in the lateral width of the glass pipe is recognized in the same manner. From the result thus obtained, a rule relating to the suitable values of the burner time and the heating rate can be formed.

RULE 2

If the fired width is proper and the change in the lateral width is proper, then the burner time is not changed;

If the fired width is proper and the change in the lateral width is greater, then the burner time is reduced;

If the fired width is proper and the change in the lateral width is smaller, then the burner time is increased;

If the fired width is smaller and the change in the lateral width is proper, then the hydrogen flow rate is increased; and If the fired width is greater and the change in the lateral width is proper, then the hydrogen flow rate is reduced.

Although the amounts of manipulation of the injection valves $V_2$ and $V_3$ and the burner time are not described as particular values, instructions for changing the valve openings provided as the result of the operation of the fuzzy diagnosis support processor 25 are output in the form of the direction of rotation and the number of revolutions of the valve rods and the time t as necessary amounts of adjustment or manipulation.

The content of the output from the fuzzy control processor 24, i.e., the amounts of manipulation are displayed as necessary adjustment contents on the CRT 22 to the operator. The results of processing the image information from the CCD camera 12 into information necessary for the outputting by the state display processing means 28 can be displayed on the CRT as a pseudo color image. The operator can use this information as a material contributing to the completion of a judgment. Ordinarily, readjustment is performed based on the thus-obtained amounts of manipulation (adjustment), so that the adjustment accuracy is improved. It is thereby possible for the operator to obtain support information necessary for the same adjustment performance as one achieved by a skilled operator without having the skill of the skilled operator and to perform the adjustment in a short period of time.

It is also possible to automatically set the openings of the valves and the burner time by transmitting the signal output from the fuzzy control processor 24 through the A/D converter to supply the information on the valves $V_2$ and $V_3$ and the burner time to the above-mentioned operating system.

Further, the operator can obtain support information on the adjustment process of the fuzzy diagnosis support processor 25 described below from the information on the pressed state of the end portion of the glass pipe after the step of sealing the glass pipe. The fuzzy diagnosis support processor 25 will be described below with reference to FIGS. 2 and 5 and a table.

Figure 12:
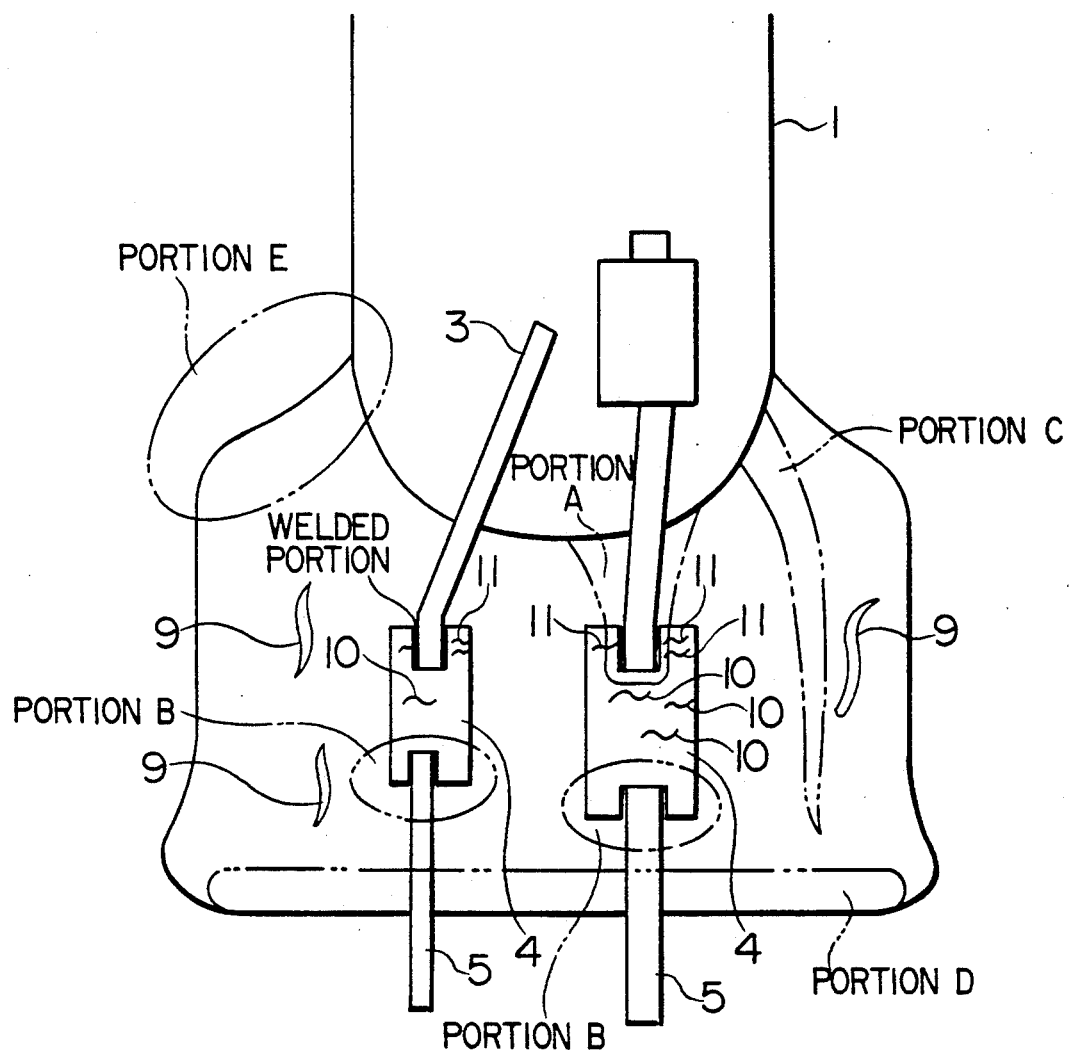
FIG. 12 is a diagram for defects on an end portion of the glass pipe.

According to the conventional art, a skilled operator observes the pressed state of the glass pipe end portion with the eyes after the step of sealing the glass pipe, examines whether there is a defect in the portions shown in FIG. 12, and, if there is a defect, determines the cause of the defect based on the skilled operator's empirical knowledge and performs necessary adjustment. The empirical knowledge of the skilled operator can be expressed in a table as causal sequences of the states of the portions and the causes, which can be expressed in the form of fuzzy inference rules and membership functions. The signal from the CCD camera cannot be used after the glass pipe sealing, because the burner flame is extinguished and there is no light source. The fuzzy diagnosis support processor 25 is therefore arranged to automatically ascertain the cause of a defect by fuzzy inference if data on the state of the sealed glass pipe is input by the operator. That is, when the operator inputs the pressed state of the glass pipe, the manipulation instruction data input support processing means 32 converts it into fuzzy rules and membership functions corresponding to the input content. The converted data is transferred to the manipulation instruction processing ○ indicating that the relationship is "average," △ indicating that the relationship is "weak."

TABLE

| Causes | Results | Breaks in Mo foil | | | | Press deficiency | | | | | Tare deformation portion |
| | | Welded portion | Central portion | | | | | | | | |
| | | Sharp breaks and creases of seal surface | Breaks and oxidation | | | Over-all | Portion | | | | |
| | | Many | Few | Distinct | Small | | A | B | C | D | E |
| N₂ flow rate | High | | | | | △ | | | | | |
| | Low | ○ | ○ | ◎ | | | | | | | |
| Sealing pressure | High | ◎ | ○ | | | | | | | | |
| | Low | | | | | ○ | | ◎ | | | |
| Burner time | Short | | | | | ○ | | ◎ | | | |
| | Long | | | | | | | | ○ | ◎ | ◎ |
| Burner position | High | | | | | | | | | | |
| | Low | | | | ○ | | △ | | △ | | | means 31, and an operating process obtained by fuzzy inference thereof is outputted. An adjustment process obtained from this result is outputted to the CRT 22 to support the judgment of the operator. It is thereby possible to input state values other than those of the signal from the CCD camera 12 and, therefore, to output the relationship between the state values which cannot be obtained from the CCD camera 12 signal and the amounts of manipulation. Thus, information for complementing the functions of the fuzzy controller 23 can be outputted.

The amounts manipulation (adjustment) set in correspondence with the state values obtained as the eye-observation result and the contents of diagnosis performed by a skilled operator (in a relationship such as the one described later with reference to Table 1) are previously made significant in the form of fuzzy inference and membership frictions as the empirical knowledge of the skilled operator. Fuzzy diagnosis data necessary for this processing is read from the floppy disk 39 or the hard disk 38 to be initially set in the manipulation instruction data input support processing means 32, when the fuzzy controller 23 is started. That is, the relationship between the state values and the amounts of manipulation is expressed in the form of a casual relation matrix shown in the table, and the amounts of adjustment and manipulation are expressed in the form of fuzzy membership functions. These parameters are related into, for example, strong and weak relationships by reverse inference based on empirical ambiguous information obtained as the result of the operator's eye-observation, thereby determining causes and degrees. Thus, the content of a decision made by the operator and expressed in a computer program is stored as operating instruction processing means 31 in the hard disk 38 or the CPU 37 belonging to the computer, so that it possible for the fuzzy diagnosis support processor 25 to automatically output decision information like the skilled operator in response to an input.

Membership functions and a causal relation matrix of fuzzy diagnosis data will next be described below. The table shown below is formed by arranging, in the form of a table, typical causal relations heard from skilled operators. The parameters shown in column headings of this table are results, i.e., state values ordinarily observed by skilled operators, and correspond to the description relating to FIG. 12. The parameters shown as row headings represent related causes. Symbols ◎, ○, △ shown in grid boxes of the table represent the strength of the relationship between the results and the causes, ◎ indicating that the relationship is "strong,"

It is possible to determine caused and degrees by performing reverse inference of these parameters, for example, with respect to strong and weak relationships on the basis of the empirical ambiguous information obtained as the result of the operator's eye-observation. As shown in FIG. 12, portion A in this table corresponds to a portion around a main electrode attachment portion; portion B, a portion around each of U-shaped lead attachment portions; portion C, left and right ends of a glass pipe press-welded portion; portion D, a glass pipe lower end portion; portion E, a tare deformation.

Figure 5:
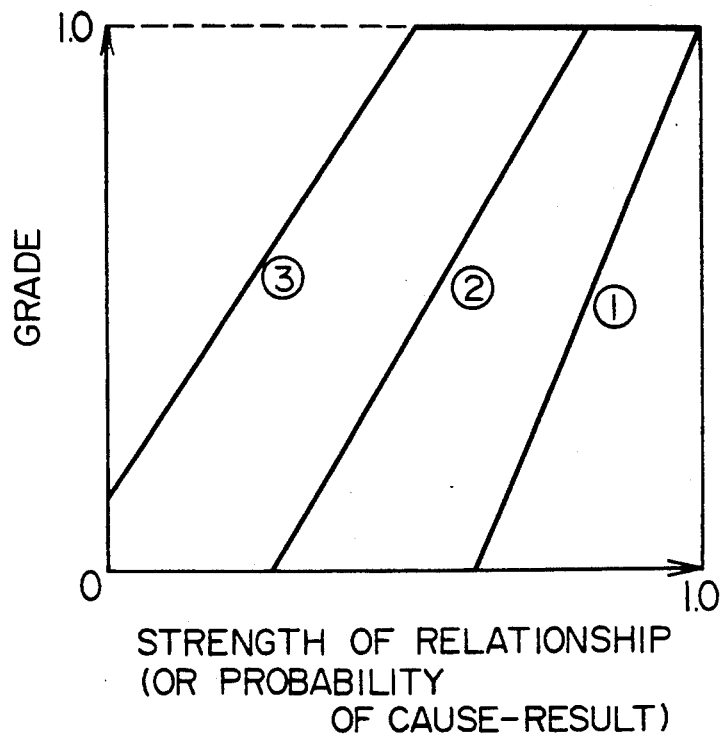
FIG. 5 is a diagram of an example of a membership function relating to a fuzzy diagnosis support processor.
Figure 6:
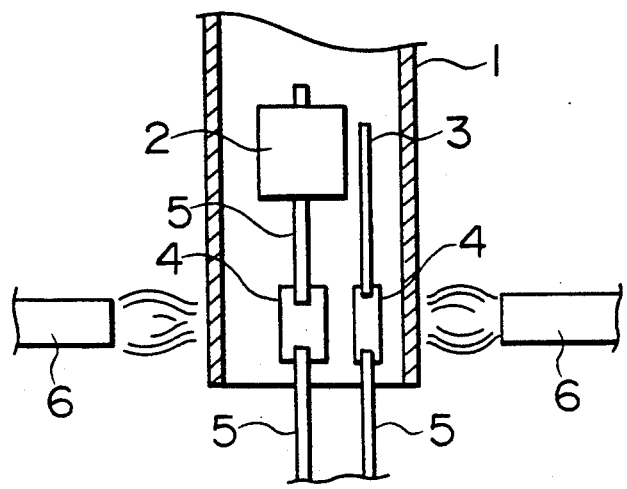
FIG. 6 is a cross-sectional view of a glass pipe heated with burners.
Figure 7:
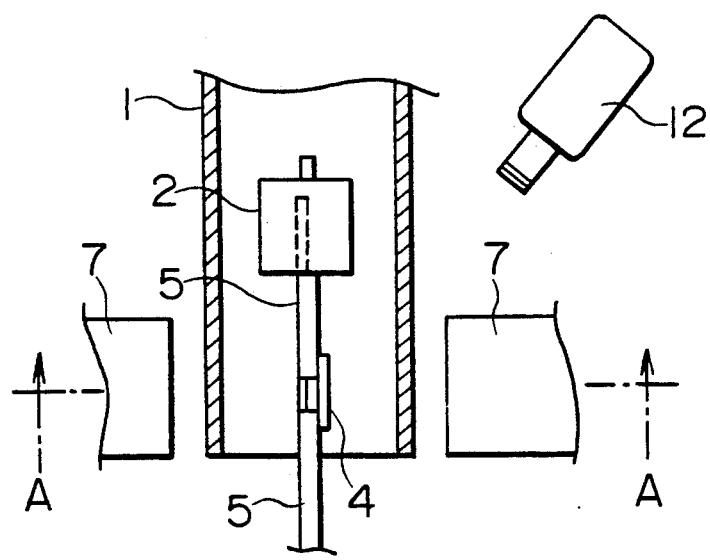
FIG. 7 is a cross-sectional view of the glass pipe shown in FIG. 6, rotated through 90° and cut along a vertical plane containing the axis of the glass pipe.
Figure 8:
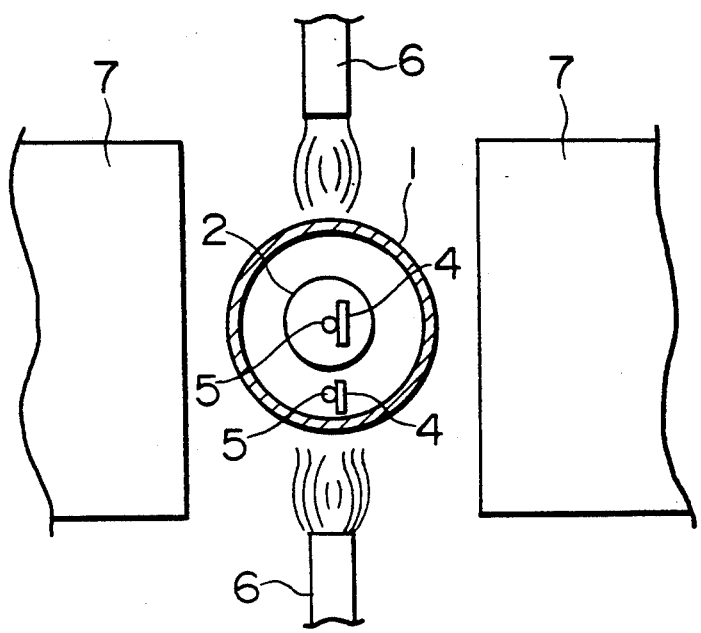
FIG. 8 is a cross-sectional view taken along the line A—A of FIG. 7.

If the strength of the above-described relationships are expressed in the form of membership functions, a relationship such as that shown in FIG. 5 is obtained. Causal sequences can be discussed by assuming a one-to-one relationship between results (state values) and causes, when the table is formed. Actually, however, one result is not always related to only one cause, and may be related to composite causes. Therefore, the strengths of connection between causes and results are expressed in the form of membership functions. For example, with respect to a result recognized as an overall press deficiency, the N₂ flow rate (high) relates to it to a small extent, and the sealing pressure and the burner time also relate to it. Also there are degrees of symptoms of the overall press deficiency. If a press deficiency occurs in portion B shown in FIG. 12, the sealing pressure and the burner time relate strongly to the deficiency. Therefore, a membership function is defined in such a manner that, as shown the strength of relationship is defined in three steps, and the magnitude of a result (e.g., a symptom of an overall press deficiency) is defined with respect to grades (in arbitrary units), and that the strength (certainty, in arbitrary units) of relationship is expressed in degrees in the range of each defined step of the strength of relationship (certainty of a cause of N₂ other than dependency upon seal pressure or burner time). In FIG. 5, both the grade and the strength of relationship are standardized. "There is a strong relationship," "There is a relationship," and "There is a weak relationship" in FIG. 5 correspond respectively to "◎," "○," and "△" written in grid boxed of the table.

The causal sequence matrix in the table described above can be expressed in the form of a fuzzy rule like RULE 3 shown below. An example of a fuzzy inference rule is shown below. Pressed states and relating symptoms include information before pressing, and the content of judgment by skilled operators include information which enables determination of corresponding causes. Therefore, these can be formed as rules.

RULE 3

If the press deficiency is overall and is small, then the N$_2$ flow rate is in excess (N$_2$ is reduced);

If the press deficiency is overall and is large, then the sealing pressure is weak (increased) and the burner time is short (increased);

If the press deficiency is at portion B and is large, then the sealing pressure is excessively weak (increased to a higher level) and the burner time is excessively short (increased to a greater extent).

This is an only an example of the rule, and more detailed causal relations can be added to the causal relations shown in the table.

The determination of causes and the amounts of manipulation have not concretely described as the result of the operation of the manipulation instruction processing means 31 with respect to the above rules. However, composite causes are concretely designated, and, with respect to the amounts of manipulation of the valve V$_1$ and the mold 7 shown in FIG. 1, a timer (not shown) for counting the burner time and the burner position, the CRT 22 is supplied width the change in the valve opening in the form of the direction of rotation and the number of rotation, the amount of manipulation of the mold 7 in the form of the change in the pneumatic pressure of the air cylinder 34, the burner time in the form of time t, and the burner position in the form of the direction and the distance in and through which the burner is moved.

The amount of manipulation in the contents of the outputs from the fuzzy controller 23 are displayed as the content of necessary adjustment on the CRT 22 to be used as a material contributing to the completion of a judgment by the operator. Normally, readjustment is performed on the basis of the amounts of manipulation (adjustment) thus prepared, so that the accuracy of the overall adjustment is improved. It is thereby possible for the operator to obtain support information necessary for the adjustment to achieve the same adjustment performance as skilled operators and to perform the adjustment in a short time.

As described above, as a signal output from the computer and sent through the A/D converter, information on the amounts of manipulation of the valve V$_1$ and the mold 7, the amounts of adjustment of the burner time and the burner position may be transmitted to the operating system to automatically set the valve opening and the time of the burner time and adjust the burner position.

In the above-described embodiment, a glass pipe of a quartz glass luminous tube is used as a glass pipe to be sealed. However, the fuzzy controller of the present invention can also be used in a process for sealing external bulb of a discharge lamp or a process for sealing a halogen lamp.

Ordinally, hydrogen gas is used as a combustible gas, and oxygen gas is used as a supporting gas, but these are not exclusive. As a shielding gas, nitrogen gas, having a cooling effect, is preferably used.

Further, an automatized system can be formed by incorporating the output from the fuzzy controller of the present invention in an on-line system. Also, the above-described fuzzy controller can be constructed as a simulation system to be utilized as an education system as well as one for an actual sealing process.

In accordance with the present invention, as described above, parameters relating to the burner flame in a glass pipe sealing process, i.e, the flow rates and the pressures of combustible, supporting and shielding gases, the burner time (heating time), and so on are optimized by a fuzzy method. It is thereby possible easily control glass pipe manufacturing facilities even if there is no skilled operator and, therefore, to improve the quality of the manufactured lamp and the yield of the sealing step as well as to reduce the operation time.

According to the present invention, the above-described effects can also be improved if a pseudo color image picked up by a camera and processed is displayed on the cathode ray tube. Further, if the fuzzy diagnosis support processor is provided, abnormality causes as well as the operation procedure can be displayed on the cathode ray tube, so that it is possible to further facilitate the operation and to completely remove abnormality causes.

What is claimed is:

1. A fuzzy controller for sealing a glass pipe for a lamp by heating an end portion of the glass pipe with burner flame to soften the end portion and by thereafter pressing the softened end portion, said fuzzy controller comprising:

a camera device for forming an image of the state of the burner flame and the softened state of the glass pipe; and a fuzzy control processor including image processing means for processing and calculating image information obtained by said camera device as a softened state change value of the glass pipe and a combustion state value of the burner flame based on image processing data, and fuzzy control means for calculating and outputting, with respect to a result of the calculation performed by said image processing means, a suitable control value for controlling at least one parameter relating to the burner flame by fuzzy inference and based on fuzzy control data including a predetermined fuzzy rule and a membership function.

2. A fuzzy controller according to claim 1, said fuzzy control processor further includes state display processing means for receiving a pseudo color image from said image processing means to display the received image on a cathode ray tube, and for displaying, on the cathode ray tube, the control value output from said fuzzy control processing means as an amount of manipulation of the parameter relating to the burner flame.

3. A fuzzy controller according to claim 2, further comprising a fuzzy diagnosis support processor including manipulation instruction data input support processing means for converting the content of an input received as a result of observation of a finished state of the sealed glass pipe into a corresponding predetermined fuzzy rule and a membership function based on fuzzy diagnosis data, and manipulation instruction processing means for performing fuzzy inference by receiving the converted result from said manipulation instruction data input support processing means to output a method of manipulating the control value to the cathode ray tube.

4. A fuzzy control system for sealing a glass pipe for a lamp by heating an end portion of the glass pipe with burner flame of burner means to soften the end portion and by thereafter pressing the softened end portion by press means, said fuzzy controller comprising:

image pickup means for forming an image of the state of the burner flame and the softened state of the glass pipe;

a fuzzy control processor including image processing means for processing and calculating image information obtained by said image pickup means as a softened state change value of the glass pipe and a combustion state value of the burner flame based on image processing data, fuzzy control means for calculating and outputting, with respect to a result of the calculating performed by said image processing means, a suitable control value for controlling at least one parameter relating to the burner flame by fuzzy inference and based on fuzzy control data including a predetermined fuzzy rule and a membership function, and state display processing means for receiving a pseudo color image from said image processing means to display the received image on a cathode ray tube, and for displaying, on the cathode ray tube, the control value output form said fuzzy control processing means as an amount of manipulation of the parameter relating to the burner flame;

a fuzzy diagnosis support processor including manipulation instruction data input support processing means for converting the content of an input received as a result of observation of a finished state of the sealed glass pipe into a corresponding predetermined fuzzy rule and a membership function based on fuzzy diagnosis data, and manipulation instruction processing means for performing fuzzy inference by receiving the converted result from said manipulation instruction data input support processing means to output a method of manipulating the control value to the cathode ray tube;

an A/D converter for converting the control value, the amount of manipulation and the manipulation method into analog signals; and an operating system for operating said burner means and said press means in an optimal manner by receiving the signals from said A/D converter as operation instruction signals.

5. A fuzzy control process using a fuzzy controller including image processing means, fuzzy control processing means, state display processing means, manipulation instruction data input support processing means and manipulation instruction processing means, image pickup means, a cathode ray tube, input means for said fuzzy controller, and an operating system for operating a burner and a mold for pressing to seal a glass pipe for a lamp by heating an end portion of the glass pipe with burner flame to soften the end portion and by thereafter pressing the softened end portion, said fuzzy control process comprising the steps of:

forming an image of the state of the burner flame and the softened state of the glass pipe by said image pickup means;

processing and calculating image information obtained by said image pickup means as a softened state change value of the glass pipe and a combustion state value of the burner flame by said image processing means based on image processing data;

calculating and outputting, from a result of the calculation performed by said image processing means, a suitable control value for controlling at least one parameter relating to the burner flame by said fuzzy control processing means and by fuzzy inference based on fuzzy control data including a predetermined fuzzy rule and a membership function;

obtaining a pseudo color image from said image processing means to display the image on said cathode ray tube, and displaying the control value output from said fuzzy control processing means on said cathode ray tube as an amount of manipulation of the parameter relating to the burner flame;

converting, by said manipulation instruction data input support processing means, the content of an input received as a result of observation of a finished state of the sealed glass pipe input through said input means into a corresponding predetermined fuzzy rule and a membership function based on fuzzy diagnosis data;

performing fuzzy inference of the converted result obtained from said manipulation instruction data input support processing means by said manipulation instruction processing means to output a method of manipulating the control value to the cathode ray tube; and outputting signals representing the control value, the amount of manipulation and the manipulation method to said operation system through an A/D converter.

* * * * *

UNITED STATES PATENT AND TRADEMARK OFFICE
CERTIFICATE OF CORRECTION

PATENT NO. : 5,305,224
DATED : April 19, 1994
INVENTOR(S) : Hishida et al

It is certified that error appears in the above-indentified patent and that said Letters Patent is hereby corrected as shown below:

Column 5, line 9, after "molybdenum,," delete one comma ","; line 19, "diametrical" should read --diametral--; line 31, after "with" insert --an--.

Column 12, line 47 after "shown" insert --in FIG. 5,--.

Column 13, line 23, after "supplied" change "width" to --with the--.

Signed and Sealed this

Twentieth Day of September, 1994

*Attest:*

BRUCE LEHMAN

*Attesting Officer*   *Commissioner of Patents and Trademarks*